United States Patent
Tickner et al.

(10) Patent No.: US 8,571,851 B1
(45) Date of Patent: Oct. 29, 2013

(54) SEMANTIC INTERPRETATION USING USER GAZE ORDER

(71) Applicant: Google Inc., Mountain View, CA (US)

(72) Inventors: Simon Tickner, Whitstable (GB); Richard Z. Cohen, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/731,508

(22) Filed: Dec. 31, 2012

(51) Int. Cl.
*G06F 17/27* (2006.01)

(52) U.S. Cl.
USPC ...... 704/9; 704/1; 704/10; 704/235; 704/257; 704/275

(58) Field of Classification Search
USPC .......................... 704/1, 9, 10, 235, 257, 275
See application file for complete search history.

(56) References Cited

U.S. PATENT DOCUMENTS

| | | | |
|---|---|---|---|
| 6,345,111 B1 * | 2/2002 | Yamaguchi et al. | 382/118 |
| 7,003,139 B2 * | 2/2006 | Endrikhovski et al. | 382/118 |
| 7,046,924 B2 * | 5/2006 | Miller et al. | 396/51 |
| 7,206,022 B2 * | 4/2007 | Miller et al. | 348/333.03 |
| 7,327,505 B2 * | 2/2008 | Fedorovskaya et al. | 358/527 |
| 7,561,143 B1 * | 7/2009 | Milekic | 345/156 |
| 8,036,467 B2 * | 10/2011 | Matraszek et al. | 382/224 |
| 8,205,165 B2 * | 6/2012 | Dal Lago | 715/764 |
| 8,259,117 B2 * | 9/2012 | Shuster et al. | 345/474 |
| 2004/0100567 A1 * | 5/2004 | Miller et al. | 348/239 |
| 2004/0103111 A1 * | 5/2004 | Miller et al. | 707/102 |
| 2008/0165195 A1 * | 7/2008 | Rosenberg | 345/473 |
| 2008/0228496 A1 * | 9/2008 | Yu et al. | 704/275 |
| 2008/0306737 A1 * | 12/2008 | Johnston et al. | 704/235 |
| 2009/0055190 A1 * | 2/2009 | Filev et al. | 704/270 |
| 2009/0063154 A1 * | 3/2009 | Gusikhin et al. | 704/260 |
| 2009/0146950 A1 * | 6/2009 | Maringelli | 345/158 |
| 2009/0315827 A1 * | 12/2009 | Elvesjo et al. | 345/157 |
| 2010/0205667 A1 * | 8/2010 | Anderson et al. | 726/19 |
| 2011/0112839 A1 * | 5/2011 | Funakoshi et al. | 704/249 |
| 2011/0175932 A1 * | 7/2011 | Yu et al. | 345/661 |
| 2011/0184735 A1 * | 7/2011 | Flaks et al. | 704/240 |
| 2012/0243729 A1 * | 9/2012 | Pasquero | 382/103 |
| 2013/0002846 A1 * | 1/2013 | De Bruijn et al. | 348/78 |
| 2013/0044055 A1 * | 2/2013 | Karmarkar et al. | 345/158 |
| 2013/0083011 A1 * | 4/2013 | Geisner et al. | 345/419 |
| 2013/0083064 A1 * | 4/2013 | Geisner et al. | 345/633 |
| 2013/0083173 A1 * | 4/2013 | Geisner et al. | 348/51 |
| 2013/0095924 A1 * | 4/2013 | Geisner et al. | 463/32 |

OTHER PUBLICATIONS

Heaven, Douglas, "Where you look predicts what you're going to say," NewScientist, Jul. 23, 2012, 2 pages, downloaded from the internet at: http://www.newscientist.com/article/dn22093-where-you-look-predicts-what-youre-going-to-say.html.

* cited by examiner

*Primary Examiner* — Lamont Spooner
(74) *Attorney, Agent, or Firm* — Fish & Richardson P.C.

(57) ABSTRACT

Methods, and systems, including computer programs encoded on computer-readable storage mediums, including a method for performing semantic interpretation using gaze order. The method includes obtaining data identifying a sequence of gaze attention dwell positions, obtaining a semantic description of elements displayed on a visual display, obtaining a transcription of an utterance, correlating the gaze attention dwell positions with the semantic description of elements to generate a sequence of one or more of the elements, performing semantic interpretation of at least one term included in the transcription based at least on the sequence of the elements, and outputting a result of performing the semantic interpretation of the at least one term.

20 Claims, 5 Drawing Sheets

SEMANTIC INTERPRETATION USING USER GAZE ORDER

TECHNICAL FIELD

This instant specification generally relates to speech recognition, and one particular implementation relates to gaze order-based semantic interpretation.

BACKGROUND

Computers sometimes have difficulty generating an accurate semantic interpretation of a user's utterance, even when a completely accurate transcription of the utterance is available. While humans are typically successful at performing semantic interpretation, machines continue to have problems performing this task.

SUMMARY

In general, this document describes systems and methods for identifying objects on a user interface based on user's gaze dwell points, and for performing semantic interpretation of the user's utterance based on the identified objects. Such an approach benefits from the insight that, when a user utters a speech input relating to objects displayed on a user interface, users typically look at objects to which they are referring, and do not refer to objects at which they have not looked.

One innovative aspect of the subject matter described by this specification can be implemented as a method that includes obtaining data identifying a sequence of gaze attention dwell positions, obtaining a semantic description of elements displayed on a visual display, obtaining a transcription of an utterance, correlating the gaze attention dwell positions with the semantic description of elements to generate a sequence of one or more of the elements, performing semantic interpretation of at least one term included in the transcription based at least on the sequence of the elements, and outputting a result of performing the semantic interpretation of the at least one term.

Other embodiments of this aspect include corresponding systems, apparatus, and computer programs, configured to perform the actions of the methods, encoded on computer storage devices.

These and other embodiments can each optionally include one or more of the following features. The method includes receiving data identifying a respective dwell time for each of the gaze attention dwell positions, and weighting each of the elements of the sequence according to the dwell time identified for the respective element; the method includes obtaining a map of gaze attention positions over time, where obtaining data identifying a sequence of gaze attention positions includes comparing determining whether a respective dwell time associated with each gaze attention position satisfies a minimum dwell time threshold; a gaze attention dwell position corresponds to a position on a user interface in which a duration of attention on a single element satisfies a minimum dwell time threshold; performing semantic interpretation includes determining that a particular term included in the transcription is associated with one of the elements on the sequence of the elements; performing semantic interpretation includes determining that a particular term included in the transcription is not associated with an element displayed on the visual display that is not one of the elements on the sequence of elements; performing semantic interpretation includes determining that a first term included in the transcription is a substitute for a first element on the sequence of elements, and determining that a second term that occurs after the first term included in the transcription is associated with a second element that occurs later in the sequence of elements than the first element; performing semantic interpretation includes determining that a first term included in the transcription is a substitute for a first element on the sequence of elements, and determining that a second term that occurs after the first term included in the transcription is not associated with a second element that occurs earlier in the sequence of elements than the first element; performing semantic interpretation includes determining that a particular term included in the transcription is a substitute for one of the elements on the sequence of the elements; performing semantic interpretation includes determining that one of the elements on the sequence of elements is a concept or entity that is associated with a particular term included in the transcription; performing semantic interpretation includes determining that a particular element on the sequence of elements that has a largest dwell time is associated with a particular term included in the transcription; performing semantic interpretation includes determining that a last element on the sequence of elements is associated with a particular term included in the transcription; the semantic interpretation is performed further based on a user language setting; outputting a result of performing the semantic interpretation includes outputting the transcription of the utterance, where the transcription or the term in the transcription is tagged with at least one element of the sequence; the semantic description includes a description of elements displayed on the virtual display, and one or more positions on the virtual display associated with each element; correlating the gaze attention dwell positions with the semantic description of elements includes matching one or more of the gaze attention dwell positions with one or more positions of elements indicated in the semantic description; and/or correlating the gaze attention dwell positions with the semantic description of elements includes overlaying the gaze attention dwell positions with the semantic description of the elements.

The systems and techniques described here may provide one or more of the following advantages. First, a system can provide contextual information to improve the semantic interpretation of spoken, textual, or other forms of linguistic commands. Gaze information can be used to improve the accuracy of automated responses to linguistic commands. By improving the accuracy of automated responses to linguistic commands, a user's overall user interface experience may be improved.

The details of one or more implementations are set forth in the accompanying drawings and the description below. Other features and advantages will be apparent from the description and drawings, and from the claims.

DETAILED DESCRIPTION

Figure 1:
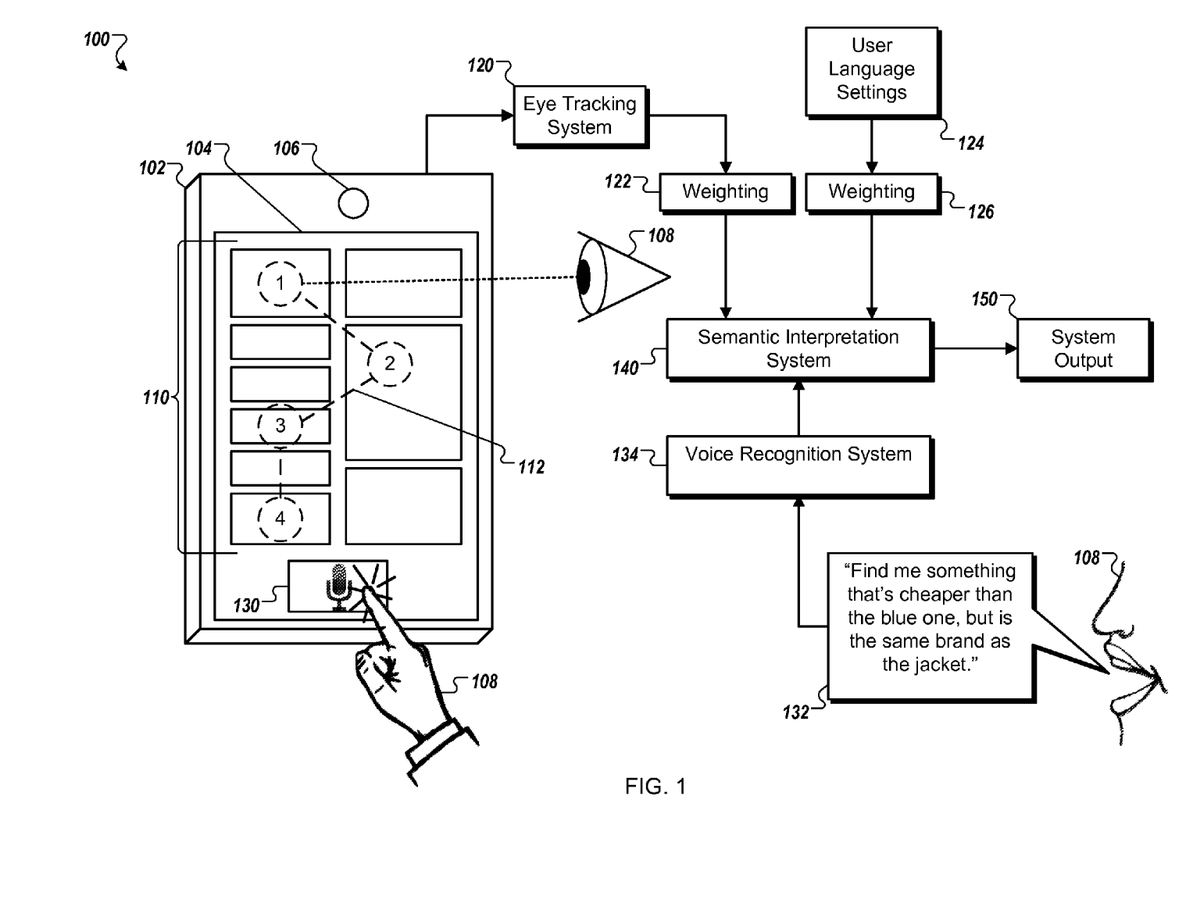
FIG. 1 is a block diagram that shows an example of a system that performs semantic interpretation using a user's gaze order.

FIG. 1 is a block diagram that shows an example of a system 100 that performs semantic interpretation using a user's gaze order. A user device 102, e.g., a smartphone, tablet computer, wearable computer, or laptop computer, includes a display 104 and a camera 106. The display 104 presents a collection of items 110 for a user 108 to observe. In general, after the eye movements of users have been tracked, the system 100 can identify a sequence of objects that the user's gaze has dwelled upon, and can use the sequence in enhancing the semantic interpretation of subsequently received utterances.

In more detail, the system 100 utilizes a front facing camera 106 on a portable computing device 102 to map gaze attention, including duration of attention on a single target, and sequence of gaze attention over time with respect to elements on a visual display 104. The pattern of attention and gaze is used as a signal to a speech recognition system 134 to improve the semantic interpretation of speech input. Relative order or subject, e.g., object and verbs cross referenced with their gaze order counterparts can provide strong signals for improving the prediction of user intent.

The system 100 can also cross reference eye tracking signals with available user language settings 124 either on the device 102 or associated with the user's account information to weight these signals. For example, such techniques may be particularly useful in conjunction with languages that have a bias for strict word order.

As the user 108 looks at the collection of items 110, the user's gaze shifts from element to element along a path 112. In the illustrated example, the user's 108 gaze shifts along the path 112 from location 1, to location 2, to location 3, and on to location 4. The locations 1-4 represent locations on the display 104 upon which the user 108 focuses his or her gaze for a detected amount of time. For example, the display 104 may present a clothing shopping web page, and the collection of elements 110 may be a collection of elements that are available for purchase. In this example, the user 108 may look at a red jacket at location 1 for a few moments, then a blue jacket at location 2, then a white shirt at location 3, and finally a red shirt at location 4.

The camera 106 is used to capture images of the user's 108 eyes as they trace the path 112. An eye tracking system 120 processes these images to determine the path 112 along with the user 108 shifted his or her gaze, the locations 1-4 at which the user 108 paused to gaze, and the durations of time that the user 108 looked at the locations 1-4. The eye tracking system 120 combines information about the known locations of the elements 110, e.g., based on metadata or other information provided in association with the elements 110 presented on the display 102 with the path 112 to determine the elements 110 that the user 108 looked at and how long the user 108 looked at the elements 110.

Information about the order and the durations of time that the user 108 looked at the locations 1-4 is provided to a weighting module 122. The weighting module 122 determines a weighting factor for at least some of the elements 110 based upon the eye tracking information provided by the eye tracking system 120. Elements 110 that the user 108 has gazed upon for relatively longer periods of time will be associated with relatively greater weights than elements 110 that the user 108 gazed upon for relatively less time. For example, the user may have looked at a red jacket element at location 1 for three time units, e.g, milliseconds, tenths of a second, seconds, and a blue jacket element at location 2 for ten time units, and the weighting module 122 may reflect this behavior by assigning a relatively higher weight with the blue jacket element to reflect the user's possible relatively greater interest in the blue jacket element at location 2.

A collection of user language settings 124 is provided to a weighting module 126. The user language settings 124 include information about the user's 108 language preferences, e.g., English, Spanish, Chinese, dialect information, e.g., potato "chip" in US English vs. "crisp" in UK English, regional settings, e.g., "soda" vs. "pop" as both relate to soft drinks in various regions of the US, and any other appropriate information that can be used to describe the user's 108 use of spoken language.

The weighting module 126 associates different mathematical weights to different words, phrases, and parts of speech as they relate to the collection of elements 110. For example, the collection of elements 110 may generally present a list of "things" for the user 108 to look at. Therefore, the weighting module 126 may assign relatively greater importance to nouns, e.g., word that describe "things", than other parts of speech. In another example, the collection of elements 110 may be known to include substantially one category of item, e.g., clothes, and give relatively greater weight to words pertaining to that category and relatively lesser weight to words pertaining to other topics, e.g., cars, foods, electronics.

The user 108 issues a voice command. In the illustrated example, the user 108 initiates the command by touching a user interface control 130, and speaks a command 132. In some implementations, initiation of the command 132 may be triggered by other user inputs, e.g., pressing a physical or virtual button, presenting a gesture, by issuing a spoken trigger word or phrase. In some implementations, the command may not need to be initiated by an action other than by speaking the command 132.

The command 132 is processed by a speech recognition system 134. The speech recognition system 134 transcribes the command 132 to determine a textual representation of the speech sounds included in the command 132. In some implementations, the command 132 may include words or phrases that are vague when taken out of context, but may be better understood when taken in the context of user actions, such as a gaze order taken along the path 112. For example, the command 132 may be "show me more items like the red one," and in the absence of context the phrase "the red one" may be too vague to interpret if, for example, there are several red items being displayed. By interpreting the command in the context of the gaze order, the intended meaning of vague terms may be better predicted. For example, out of five red items displayed to the user 108, the user 108 may have dwelled his gaze upon primarily only on the third red item, and the phrase "the red one" may be interpreted as meaning the third red item and not one of the other four red items.

The command 132, as transcribed by the speech recognition system 134, is received by a semantic interpretation system 140. The semantic interpretation system 140 also receives the weighting information provided by the weighting module 122 and the weighting module 126. The semantic interpretation system 140 uses the weighting information to interpret the semantics of the command 132. Information determined by the eye tracking system 120 is used by the semantic interpretation system 140 to augment the interpretation of the command 132.

For example, the user 108 may say a command such as, "find me something that's cheaper than the blue one, but is the same brand as the jacket." Taken alone, the example command may be too vague to interpret, e.g., the pronoun "one" has no meaningful context in this example command. Context information about the collection of elements 110 may be used by the semantic interpretation system 140 to augment the interpretation.

In some implementations, semantic interpretation is performed further based on a user language setting. For example, the user 108 may be browsing an American website for baby supplies, and the user language settings 124 may indicate that the user 108 speaks British English. In such an example, a user command "show me a pram that's cheaper than the white one," may be interpreted to refer to an item that the user 108 gazed at but is described in metadata as being a baby stroller.

In some implementations, performing semantic interpretation can include determining that a particular term included in the transcription is a substitute for one of the elements on the sequence of the elements. For example, information that describes the collection of elements 110 may describe an item as being associated with the categories of "style=jacket" and "color=blue" among other things. But in another example, the collection of elements 110 may include visual representations of multiple jackets and/or multiple blue items.

In examples such as this, the semantic interpretation system 140 can use information from the eye tracking system 120 to help identify the elements that the user 108 may be talking about. For example, the user 108 may have looked at an image of a particular blue element, e.g., a hat, longer than the image of any other blue element among a collection of images of blue elements, and may have looked at the image of a particular jacket longer than any other jacket image included in the collection of elements. In such an example, the semantic interpretation system 140 may interpret the command 132 to mean "find me [a hat] that's cheaper than the [blue hat at location 2], but is the same brand as the jacket [at location 3]."

In some implementations, performing semantic interpretation can include determining that one of the elements on the sequence of elements is a concept or entity that is associated with a particular term included in the transcription. For example, the semantic interpretation system 140 may use information about the collection of elements 110 to determine additional contextual meaning for the command 132. For example, the semantic interpretation system 140 may have access to pricing and brand information for the collection of elements 110. In such an example, the contextual information may indicate that that the "blue hat at location 2" has a price of $50, and that the "jacket at location 3" is a Brand X Clothing brand jacket. The semantic interpretation system 140 may use the contextual information to further interpret the command 132 to mean "find me [a hat] that's [less than $50], [and] is [a Brand X Clothing brand item]".

In some implementations, the command 132 may be provided by a textual or other linguistic form of command other than speech. For example, the user may type the command 132 on a keyboard for submission to the semantic interpretation system 140. In another example, the camera 106 may observe the user using sign language or performing other gestures, and these gestures may be transcribed or otherwise interpreted by a gesture recognition system to provide the command 132.

A system output module 150 receives the semantically interpreted command from the semantic interpretation system 140. The system output module 150 processes the semantically interpreted command to provide an output. In some implementations, the system output module 150 can parse the semantically interpreted command to determine an instruction that can be interpreted by other systems to provide a response to the command 132. For example, the system output module 150 may determine a search query that may be responsive to the command 132.

Figure 2:
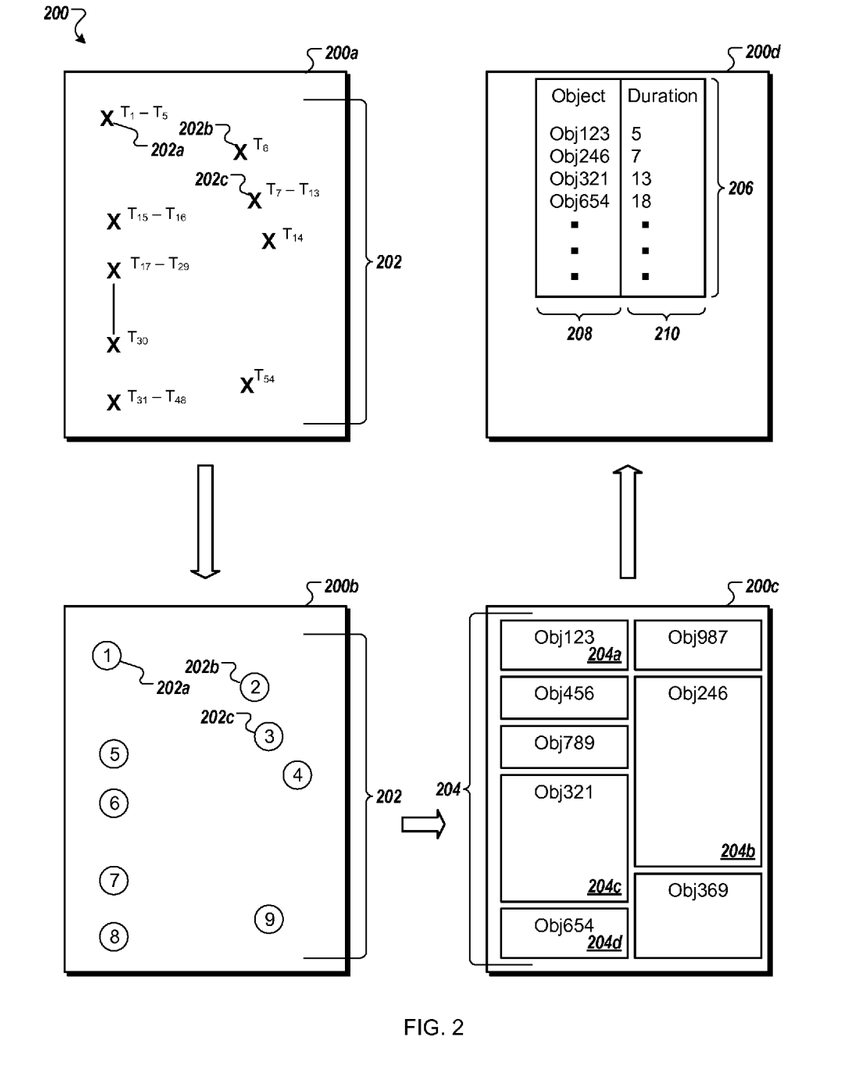
FIG. 2 shows several stages of semantic interpretation using a user's gaze order across an example user interface.

In addition to dwelled upon items and associated times, the sequence of gazes can also provide information for the semantic interpretation of user commands. For example, a command such as, "that one's too big, that one's too small, that one's just right," may be issued. If the user had been detected as having looked at elements A-B-C-D, the system 100 may determine that the "big" object is mostly likely to refer to object B, determine that object A is less likely to refer be the "small" one, and determine that it is more likely that one of C and D are the "small" ones FIG. 2 shows several stages of semantic interpretation using a user's gaze order across an example user interface (UI) 200. In some implementations, the UI 200 may be presented by the display 104 of FIG. 1. As depicted as UI 200a, the user has gazed at each of a collection of gaze locations 202 for a detected amount of time. In the illustrated example, the user has gazed at the gaze location 202a from time $T_1$ to time $T_5$, and has gazed at the gaze location 202b during time $T_6$, and at the gaze location 202c from time $T_7$ to time $T_{13}$, and so on.

As depicted as UI 200b, a gaze order has been determined, e.g., by the eye tracking system 120, for the collection of gaze locations 202. In the illustrated example, the user has gazed at the gaze location 202a, then the gaze location 202b, then the gaze location 202c, and so on. The determined locations and order of the user's gaze forms a gaze path, such as the gaze path 112.

As depicted as UI 202c, a collection of display element locations 204 is shown. Each of the display element locations 204 corresponds to a region of the UI 202 within which a visible element, e.g., image, text, video, is displayed. In the illustrated example, the display element location 204a corresponds to an object "OBJ123", the display element location 204b corresponds to an object "OBJ246", the display element location 204c corresponds to an object "OBJ321", and the display element location 204a corresponds to an object "OBJ654".

In some implementations, the collection of display element locations 204 may correspond to a collection of displayed elements. For example, the UI 200 may present a shopping web page in which each of the display element locations 204 may include an image or other representation of a product for sale, e.g., OBJ123 may be a coat, OBJ246 may be a hat. In another example, the UI 200 may present a map in which each of the display element locations 204 may include a displayed geographic region, e.g., OBJ123 may include an image of Oregon, and OBJ246 may include an image of Nebraska.

In some implementations, semantic descriptions of the collection of element locations 204 may be determined explicitly. For example, a shopping web page may include metadata that describes regions in which visible elements are to be presented, and/or metadata that describes the elements that appear at various regions, e.g., somewhere within the display element location 204d is an image of a green hat that costs $20 and is out of stock.

In some implementations, semantic descriptions of the collection of element locations 204 may be determined implicitly. For example, image processing may be applied to a web page to determine metadata to describe displayed elements, e.g., the display element location 204d may be created to describe an image that has been processed to determine that it depicts a green hat.

As depicted in UI 200d, information about the gaze locations 202 and the display element locations 204 is processed, e.g., by the eye tracking system 120 and/or the weighting module 122, to determine a collection of gaze path descriptors 206. The collection of gaze path descriptors 206 provides a list of object identifiers 208 and object weights 210 arranged according to the user's gaze order. For example, the user may have looked at the object OBJ123 for five seconds and is given an object weight of "5", then at the object OBJ246 for seven seconds and is given an object weight of "7", and so on. In some implementations, the determination of the object weights 210 from gaze durations may be proportional, exponential, logarithmic, or may be determined using any other appropriate conversion factor.

In some implementations, the collection of gaze path descriptors 206 may include information for only those objects at which the user gazed for longer than a predetermined length of time. For example, the collection of gaze path descriptors 206 may exclude entries for elements 204 that the user did not look at, e.g., gaze duration=0, or may exclude entries for elements 204 that user looked at for less than a predetermined length of time, e.g., the user only looked at the location 202b during time period $T_6$ while the minimum dwell time threshold is T>2.

In some implementations, the systems, e.g., the system 100, that perform gaze tracking may track the user's gaze to general regions of the UI 200. For example, the camera 106 may lack the pixel resolution or light sensitivity needed to track the user's 108 gaze accurately enough to determine which element the user 108 was looking at. In another example, the display 104 may be relatively small, e.g., a smartphone display, thereby causing visible elements to be rendered relatively close to each other. In examples such as these, the user's 108 gaze may be interpreted more generally, e.g., to determine the half, quadrant, or other general region of the UI 200 that the user was looking at. For example, for a command such as "Show me more like the blue one," after the user 108 was detected to have gazed somewhere in the lower half of the UI 200, and the phrase "the blue one" may be interpreted as being more likely to mean a blue item displayed in the lower half of the UI 200 and less likely to mean a blue item displayed in the upper half of the UI 200.

Figure 3:
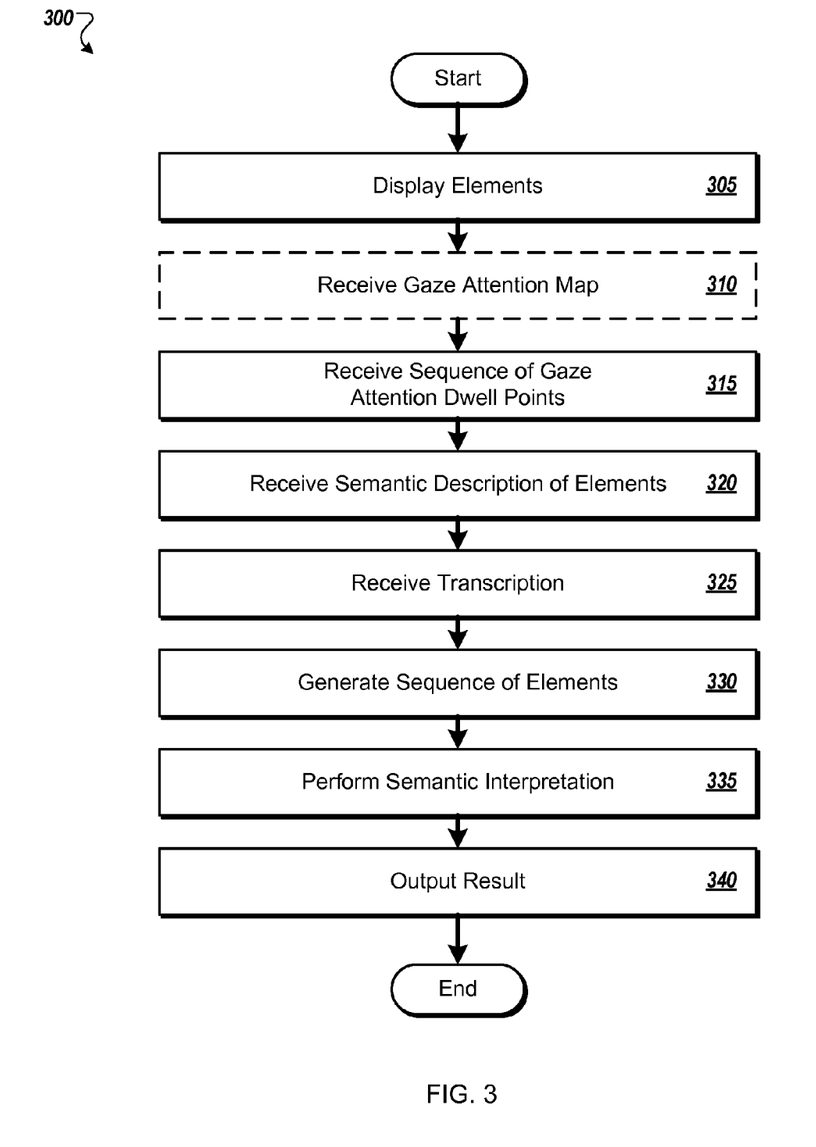
FIG. 3 is flow chart that shows an example of a process for semantic interpretation using a user's gaze order.

FIG. 3 is flow chart that shows an example of a process 300 for semantic interpretation using a user's gaze order. In some implementations, the process 300 may be performed by the system 100 of FIG. 1 and/or the UI 200 of FIG. 2.

At 305, visible elements are displayed. For example, the collection of elements 110 can be presented on the display 104, or a visible element can be presented within each of the display element locations 204 displayed by the UI 202. In some implementations, the visible elements can be images, text blocks, videos, or any other appropriate form of visible media that can be displayed within a region of the display 104 or the UI 202.

At 310, a gaze attention map may be received. In some implementations, the gaze attention map can be a collection of information that describes how the visible elements were displayed at 305. For example, the gaze attention map may be determined from HTML code that describes a web page that is parsed to display the visible elements. In another example, the gaze attention map may be determined from metadata associated with the visible elements. In some implementations, the gaze attention map may be received from an application that is being used to display the visible elements. For example, a shopping app, e.g., smart phone or tablet software application, may determine the content and layout of visible elements on a display, and information about the determined content and layout may be provided at the gaze attention map. In another example, an HTML page that includes visible elements may be rendered differently depending on the size of the browser window, the user's settings, the capabilities of the browser, the platform, e.g., smartphone, tablet, PC, and the browser may provide information about the rendering as the gaze attention map.

At 315, data identifying a sequence of gaze attention dwell positions is obtained. For example, the semantic interpretation system 140 can receive information describing the gaze path 112 from the eye tracking system 120 and the weighting module 122. The information includes the locations, e.g., the locations 1-4, that the user 108 looked at, the durations of time that the user 108 looked at each of the locations, and the order in which the user 108 looked at them.

In some implementations, the gaze attention dwell position corresponds to a position on a user interface in which a duration of attention on a single element satisfies a minimum dwell time threshold. For example, a location, e.g., of the locations 202, may only be identified as a dwell position if the user looked at the location for longer than a predetermined period of time, such as 500 ms, 1 second, 2 seconds, 5 seconds, or any other appropriate length of time. In some implementations, use of a predetermined minimum dwell time threshold can differentiate between locations of objects for which the user has shown interest from objects at locations in which the user demonstrated comparatively lesser interest.

At 320, a semantic description of elements displayed on the visual display is obtained. For example, the user device 102 can render the display 104 using information, e.g., HTML code, metadata, app data, that includes data that describes the items 110, such as display location, category, brand, price, color, size, vendor, or combinations of these and other appropriate descriptors that can be used to describe one or more visible elements. For example, semantic description data can describe a visible element at location 1 as a blue, full-size, carbon-fiber tennis racket that costs $150 and is made by Vendor A; describe a visible element at location 2 as a green, youth-size aluminum tennis racket that costs $40 and is made by Vendor B; describe a visible element at location 3 as a red, youth size jacket that costs $60 and is made by Vendor B; and describe a visible element at location 4 as a chrome-plated, extended length golf club that costs $90 and is made by Vendor C.

At 325, a transcription of an utterance is obtained. For example, the user 108 can utter the command 132, and the semantic interpretation system 140 can receive a transcription of the command 132 from the speech recognition system 134.

At 330, the gaze attention dwell positions are correlated with the semantic description of visible elements to generate a sequence of one or more of the elements. For example, the semantic interpretation system 140 can process the gaze path 112 and semantic description information to determine what the user 108 looked at based upon where the user 108 looked and for how long.

In some implementations, correlating the gaze attention dwell positions with the semantic description of elements can include matching one or more of the gaze attention dwell positions with one or more positions of elements indicated in the semantic description. For example, the eye tracking system 120 can determine that the user 108 looked at the location 2 for seven seconds, and this information can be correlated with semantic description data for location 2 to determine that the user 108 was actually spent seven seconds looking at a green, youth-size aluminum tennis racket that costs $40 and is made by Vendor B.

In some implementations, correlating the gaze attention dwell positions with the semantic description of elements can include overlaying the gaze attention dwell positions with the semantic description of the elements. For example, the semantic interpretation system 140 may conceptually overlay the collection of locations 202 over the collection of display element location 204 to determine which of the display objects that the user looked at, the order in which the user looked at each of the display elements, and the durations of time that the user looked at each of the display elements.

At 335, a semantic interpretation of at least one term included in the transcription is performed based at least on the sequence of the elements. In some implementations, performing semantic interpretation can include determining that a particular term included in the transcription is associated with one of the elements on the sequence of the elements. For example, the user 108 may utter the command, "Find me something that's cheaper than the blue one, but is the same brand as the jacket." The semantic interpretation system 140 may use the sequence of elements, e.g., information based on the gaze path 112, to interpret that "the blue one" is likely to correspond to blue, full-size, carbon-fiber tennis racket that costs $150, is made by Vendor A, and is displayed at location 1, and is less likely to correspond to a pair of blue pants displayed elsewhere on the display 104 that the user looked at only momentarily or not at all. Similarly, the semantic interpretation system 140 may interpret "cheaper" as meaning "less than $150", and may interpret "same brand as the jacket" as meaning "Vendor B".

In some implementations, performing semantic interpretation can include determining that a particular element on the sequence of elements that has a largest dwell time is associated with a particular term included in the transcription. For example, the user may have looked at a first flower arrangement for ten seconds, and at a second flower arrangement for two seconds. In response to the command "purchase the flowers," the semantic interpretation system 140 may determine that the user intends to purchase the first flower arrangement, e.g., because that was the arrangement that the user gazed at the longest.

In some implementations, performing semantic interpretation can include determining that a last element on the sequence of elements is associated with a particular term included in the transcription. For example, the user may visually compare two or more items by shifting his gaze back and forth. In some examples, the user may tend to look at look at the item he decided upon last before issuing a spoken command such as "put the item in my cart". In such examples, the semantic interpretation system 140 may determine that "the item" refers to the item that the user looked at last.

At 340, a result of performing the semantic interpretation of the at least one term is output. For example, the semantic interpretation system 140 may provide a semantically interpreted version of the command 132 as the system output 150. Continuing the previous example, the system output 150 can be a search query such as "product=tennis racket, brand=Vendor B, price<$150". In some implementations, the output result can be provided to produce further results. For example, the output result can be used to trigger an action in response to the command 132, such as to perform a search or other operation based at least partly on the collection of items 110.

In some implementations, outputting a result of performing the semantic interpretation comprises outputting the transcription of the utterance, where the transcription or the term in the transcription is tagged with at least one element of the sequence. In some implementations, the semantic description comprises a description of elements displayed on the virtual display, and one or more positions on the virtual display associated with each element. For example, the command "find me something that's cheaper than the blue one, but is the same brand as the jacket" may be processed to add contextual information to terms and phrases that might otherwise be too ambiguous to for downstream processes to understand. For example, the command may be tagged to create a system output such as, ""find me something [hat] that's cheaper than [<$50] the blue one [hat at location 2], but is the same brand [=Brand X Clothing] as the jacket [at location 3]."

In some implementations, performing semantic interpretation can include determining that a particular term included in the transcription is not associated with an element displayed on the visual display that is not one of the elements on the sequence of elements. For example, none of the gazed items described in the previous example are responsive to a query such as "product=bowling ball, brand=Vendor B". In response to determining that the user did not look at a bowling ball, nor was there one displayed elsewhere on the display 104, the system output 150 may trigger a search for other items, e.g., bowling balls made by Vendor B, for subsequent presentation to the user 108.

In some implementations, performing semantic interpretation can include determining that a first term included in the transcription is a substitute for a first element on the sequence of elements, and determining that a second term that occurs after the first term included in the transcription is associated with a second element that occurs later in the sequence of elements than the first element. For example, the user may look at a blue jacket, then at a green jacket, and then at a blue hat. When the semantic interpretation system 140 attempts to interpret the meaning of the phrase "the blue one", the semantic interpretation system 140 may interpret this as referring to the latter blue hat rather than the former blue jacket.

In some implementations, performing semantic interpretation can include determining that a first term included in the transcription is a substitute for a first element on the sequence of elements, and determining that a second term that occurs after the first term included in the transcription is not associated with a second element that occurs earlier in the sequence of elements than the first element. For example, the user may look at a red truck, then at a green truck, and then at a red car. The user may then utter the command, "Show me more items like the green one, but the same brand as the red one." The semantic interpretation system 140 may interpret "the green one" as meaning the green truck, and may interpret "the red one" as referring to the red car that the user looked at after the green truck and not the red truck that the user looked at before the green truck.

Figure 4:
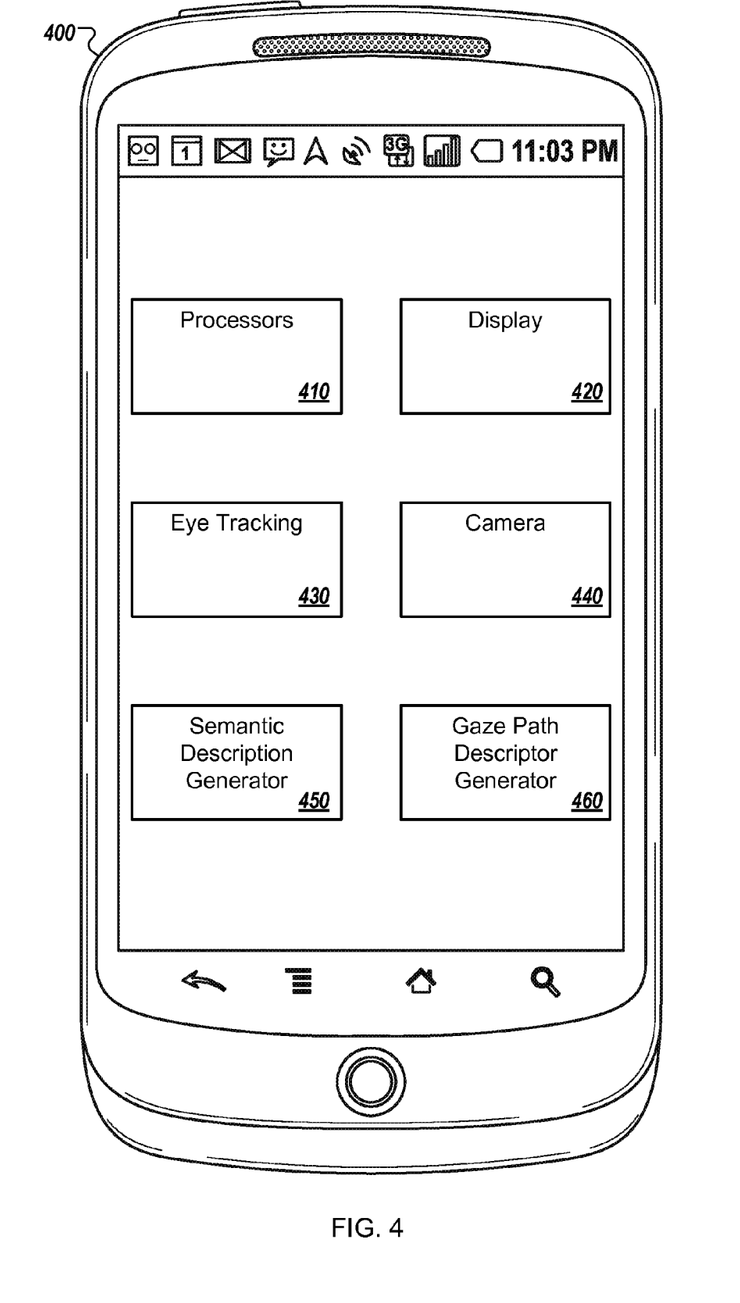
FIG. 4 is a block diagram of an example device for semantic interpretation using a user's gaze order.

FIG. 4 is a block diagram of an example device 400 for semantic interpretation using a user's gaze order. In some implementations, the device 400 can be the device 102 of FIG. 1. For example, the device 400 can be a computer, a tablet, a netbook, a smartphone, a video game console, a cable, satellite, or other form of set-top box, a smart television, or any other appropriate device that can display items and can detect the direction of a user's gaze. In some implementations, the device 400 can perform the operations of the process 300 of FIG. 3.

In general, the device 400 can combine eye tracking with speech recognition to improve the semantic interpretation of speech recognition. Additionally, a user can configure the device 400 to reference user account information pertaining to language preferences and nationality data as additional inputs that can further assist in the semantic interpretation of recognized speech.

The device 400 includes one or more processors 410. The processors 410 perform operations for semantically interpreting a user's gaze order. For example, the processors 410 may perform the process 300 to produce the system output 150.

A display 420 is included to present visible elements to the user. For example, the display 420 can be the display 104 to present the UI 200 of FIG. 2. An eye tracking system 430 can use imagery of the user's eyes captured by the camera 440 to determine what the user was looking at on the display 420. For example, the camera 106 can capture images of the user's 108 eyes, and the eye tracking system 120 can use the captured images to determine that the user 108 looked at the locations 1, 2, 3, and 4.

A gaze path descriptor generator 450 determines a collection of user gaze path descriptors. In some implementations, the collection of gaze path descriptors can include information that identifies the visible elements that the user was looking at and for how long each element was looked at. In some implementations, the collection of gaze path descriptors can include ordering information that describes the sequence in which the visible elements were looked at. For example, the gaze path descriptors 206 of FIG. 2 provides a time-ordered list of the object identifiers 208 for the visible objects 204 that the user 108 looked at, and corresponding object weights 210 that correspond to the lengths of time that the user 108 looked at each of the objects 204.

A semantic description generator 460 accepts user input, e.g., spoken commands, written commands, gestures, interprets the user input in the context of the user's gaze, and provides a system output. For example, the semantic interpretation system 140 receives inputs from the eye tracking system 120, the user language settings 124, the speech recognition system 134, information about the locations 110 displayed on the display 104, and semantic descriptions of displayed elements is used to interpret the command 132 in the context of what the user 108 looked at on the display 104.

For situations in which the systems discussed here collect personal information about users, or may make use of personal information, e.g., the user language settings 124, the users may be provided with an opportunity to control whether programs or features collect personal information, e.g., information about a user's social network, social actions or activities, profession, language settings, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used by a content server.

Figure 5:
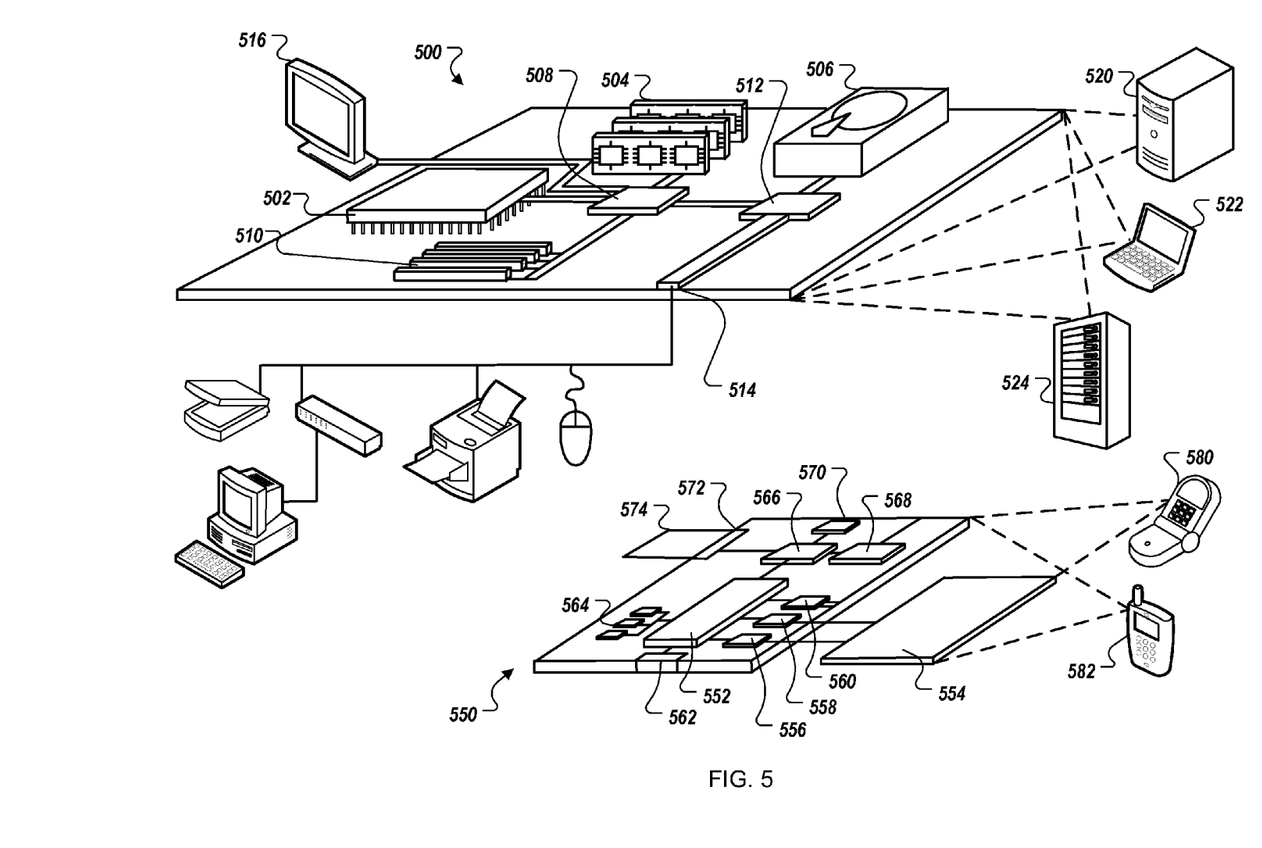
FIG. 5 is a block diagram of example computing devices.

FIG. 5 is a block diagram of computing devices 500, 550 that may be used to implement the systems and methods described in this document, either as a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards, not shown. In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device, not shown, such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver, not shown. In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for semantically interpreting speech recognition results using gaze tracking data, the method comprising:
    obtaining data identifying a sequence of gaze attention dwell positions and a gaze order associated with each gaze attention dwell position, wherein a gaze attention dwell position corresponds to a position on a user interface in which a duration of attention on a single element satisfies a minimum dwell time threshold;
    after obtaining the data identifying the sequence of gaze attention dwell positions and the gaze order associated with each gaze attention dwell position, receiving audio data encoding an utterance;
    obtaining a transcription of the utterance;
    correlating the gaze attention dwell positions and the gaze order associated with each gaze attention dwell position with a semantic description of elements displayed on a visual display to identify one or more particular elements and a respective gaze order associated with each particular element;
    performing semantic interpretation of at least one term included in the transcription based at least on the gaze order associated with the particular elements; and
    outputting a result of performing the semantic interpretation of the at least one term.

2. The method of claim 1, further comprising:
    receiving data identifying a respective dwell time for each of the gaze attention dwell positions; and
    weighting each of the particular elements according to the dwell time identified for the respective element.

3. The method of claim 1, further comprising:
    obtaining a map of gaze attention positions over time, wherein obtaining data identifying a sequence of gaze attention dwell positions comprises comparing determining whether a respective dwell time associated with each gaze attention dwell position satisfies a minimum dwell time threshold.

4. The method of claim 1, wherein performing semantic interpretation comprises determining that a particular term included in the transcription is associated with one of the elements in the one or more particular elements.

5. The method of claim 1, wherein performing semantic interpretation comprises:
    determining that a particular element displayed on the visual display is not one of the elements in the sequence of elements; and
    eliminating the particular element as a candidate interpretation of the particular term based at least on determining that the particular element is not one of the elements in the one or more particular elements.

6. The method of claim 1, wherein performing semantic interpretation comprises:
    determining that a first term included in the transcription is a substitute for a first element in the one or more particular elements;
    determining that a second term that occurs after the first term in the transcription is associated with a second element that occurs later in order than the first element;
    selecting the first element or the second element as candidate interpretations of the first term and the second term, respectively, based on determining that (i) the first term included in the transcription is a substitute for the first element and (ii) the second term included in the transcription is a substitute for the second element.

7. The method of claim 1, wherein performing semantic interpretation comprises:
    determining that a first term included in the transcription is a substitute for a first element of the one or more particular elements; and
    eliminating a second element that occurs earlier than the first element in the sequence of elements as a candidate interpretation of a second term that occurs after the first term in the transcription based at least on determining that the first term included in the transcription is a substitute for the first element in the sequence of elements.

8. The method of claim 1, wherein performing semantic interpretation comprises determining that a particular term included in the transcription is a substitute for one of the elements of the one or more particular elements.

9. The method of claim 1, wherein performing semantic interpretation comprises determining that one of the elements of the one or more particular elements is a concept or entity that is associated with a particular term included in the transcription.

10. The method of claim 1, wherein performing semantic interpretation comprises determining that a particular element of the one or more particular elements that has a largest dwell time is associated with a particular term included in the transcription.

11. The method of claim 1, wherein performing semantic interpretation comprises determining that a last element of the one or more particular elements is associated with a particular term included in the transcription.

12. The method of claim 1, wherein the semantic interpretation is performed further based on a user language setting.

13. The method of claim 1, wherein outputting a result of performing the semantic interpretation comprises outputting the transcription of the utterance, wherein the transcription or the term in the transcription is tagged with at least one element of the one or more particular elements.

14. The method of claim 1, wherein correlating the gaze attention dwell positions with the semantic description of elements comprises matching one or more of the gaze attention dwell positions with one or more positions of elements indicated in the semantic description.

15. The method of claim 1, wherein correlating the gaze attention dwell positions with the semantic description of elements comprises overlaying the gaze attention dwell positions with the semantic description of the elements.

16. A system comprising:
one or more computers; and
a computer readable storage medium storing computer software instructions executable by the one or more computers to perform operations comprising:
obtaining data identifying a sequence of gaze attention dwell positions and a gaze order associated with each gaze attention dwell position;
obtaining a transcription of an utterance;
correlating the gaze attention dwell positions and the gaze order associated with each gaze attention dwell position with a semantic description of elements displayed on a visual display to identify one or more particular elements and a respective gaze order associated with each particular element;
performing semantic interpretation of at least one term included in the transcription based at least on the gaze order associated with particular elements; and
outputting a result of performing the semantic interpretation of the at least one term.

17. The system of claim 16, wherein the operations comprise:
receiving data identifying a respective dwell time for each of the gaze attention dwell positions; and
weighting each of the one or more particular elements according to the dwell time identified for the respective element.

18. A computer-readable storage device storing software comprising instructions executable by one or more computers which, upon such execution, cause the one or more computers to perform operations comprising:
obtaining data identifying a sequence of gaze attention dwell positions and a gaze order associated with each gaze attention dwell position;
obtaining a transcription of an utterance;
correlating the gaze attention dwell positions and the gaze order associated with each gaze attention dwell position with a semantic description of elements displayed on a visual display to identify one or more particular elements and a respective gaze order associated with each particular element;
performing semantic interpretation of at least one term included in the transcription based at least on the gaze order associated with particular elements; and
outputting a result of performing the semantic interpretation of the at least one term.

19. The device of claim 18, wherein a gaze attention dwell position corresponds to a position on a user interface in which a duration of attention on a single element satisfies a minimum dwell time threshold.

20. The device of claim 18, wherein the semantic description comprises a description of elements displayed on the virtual display, and one or more positions on the virtual display associated with each element.

* * * * *